US008643545B2

(12) United States Patent
Strutt et al.

(10) Patent No.: US 8,643,545 B2
(45) Date of Patent: Feb. 4, 2014

(54) DETERMINING POSITION OF A NODE AND REPRESENTING THE POSITION AS A POSITION PROBABILITY SPACE

(75) Inventors: Guenaell T. Strutt, Sanford, FL (US); Peter B. Deoge, Orlando, FL (US); Keith J. Goldberg, Casselberry, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1367 days.

(21) Appl. No.: 11/965,447

(22) Filed: Dec. 27, 2007

(65) Prior Publication Data

US 2009/0170526 A1 Jul. 2, 2009

(51) Int. Cl.
*G01S 5/00* (2006.01)
(52) U.S. Cl.
USPC .......................................... 342/452; 342/451
(58) Field of Classification Search
USPC .................. 342/385–391, 450–451, 461–464
See application file for complete search history.

(56) References Cited

U.S. PATENT DOCUMENTS

| 5,045,860 | A * | 9/1991 | Hodson .......................... 342/451 |
| 6,526,283 | B1 * | 2/2003 | Jang ............................. 455/456.5 |
| 6,768,730 | B1 | 7/2004 | Whitehill |
| 6,894,644 | B2 * | 5/2005 | Duffett-Smith et al. ....... 342/387 |
| 6,894,645 | B1 * | 5/2005 | Akopian et al. .............. 342/464 |
| 7,054,126 | B2 | 5/2006 | Strutt et al. |
| 7,076,259 | B2 | 7/2006 | Belcea |
| 2008/0158062 | A1 * | 7/2008 | Fullerton et al. .............. 342/458 |
| 2009/0168674 | A1 * | 7/2009 | Strutt et al. ................... 370/310 |
| 2010/0109952 | A1 * | 5/2010 | Wigren et al. ................ 342/451 |

FOREIGN PATENT DOCUMENTS

| WO | WO0247419 A | 6/2002 |
| WO | WO2004023155 A1 | 3/2004 |

OTHER PUBLICATIONS

PCT Search Report Dated Mar. 16, 2009.
International Preliminary Report on Patentability for International Application No. PCT/US2008/082554 issued on Jun. 29, 2010.

* cited by examiner

*Primary Examiner* — Jack W Keith
*Assistant Examiner* — Fred H Mull
(74) *Attorney, Agent, or Firm* — Randi L. Karpinia; Daniel R. Bestor (57) ABSTRACT

Methods and apparatus are provided for determining and representing a location or position of a node in a network. When the node receives position measurement information from a reference node, the node generates, based on the position measurement information, a position probability space (PPS) which defines a space that encompasses possible positions where the node is possibly positioned in the network. The PPS includes a centroid (i.e., a set of coordinates), and a set of vectors which originate from the centroid and define the space around the centroid. The magnitude of each vector reflects the accuracy of the position in the direction of the vector.

21 Claims, 5 Drawing Sheets

DETERMINING POSITION OF A NODE AND REPRESENTING THE POSITION AS A POSITION PROBABILITY SPACE

FIELD OF THE INVENTION

The present invention relates generally to locationing or positioning techniques in wireless communication networks, and in particular to determining and representing a location or position of a node within a wireless communication network.

BACKGROUND

Wireless communication networks can generally be classified as either infrastructure-based wireless networks or ad hoc wireless networks.

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network.

In many wireless communication networks, it is desirable to determine the location or position of a node within that network. In conventional locationing or positioning technologies, a location or position of a node is typically represented by a point (i.e., a set of coordinates) and a simple indication of the accuracy or precision of that position. For instance, the location or position of the node can be represented using a circle of radius (r) that originates from a point (x,y), where the radius (r) of the circle represents the accuracy or precision of that position.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Methods and apparatus are provided for determining and representing a location or position of a node in a network. When the node receives position measurement information from a reference node, the node generates, based on the position measurement information, a position probability space (PPS) which defines a space that encompasses possible positions where the node is possibly positioned in the network. The PPS includes a centroid (i.e., a set of coordinates), and a set of vectors which originate from the centroid and define the space around the centroid. The magnitude of each vector reflects the accuracy of the position in the direction of the vector.

Before describing in detail embodiments that are in accordance with the present invention, it should be observed that the embodiments reside primarily in combinations of method steps and apparatus components related to determining and representing a location or position of a node. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one module or action from another module or action without necessarily requiring or implying any actual such relationship or order between such modules or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for determining and representing a location or position of a node described herein. The non-processor circuits may include, but are not limited to, a radio receiver, a radio transmitter, signal drivers, clock circuits, power source circuits, and user input devices. As such, these functions may be interpreted as steps of a method for determining and representing a location or position of a node. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

There are numerous techniques and technologies which can be utilized to determine and represent a location or position of a node. In most, if not all, of the these technologies, the location or position of the node is communicated to an end user as a set of coordinates (e.g., x,y or x,y,z) with some indication of the precision (e.g., a circle having a radius (r) centered at those coordinates). In many environments, representing the location or position of a node in a network using absolute coordinates and a simple indication of precision is not necessarily the optimum approach.

Positioning measurements provided in conventional positioning technologies can be used to determine where a node is not located (i.e., positioning measurements can allow a node to determine positions where it can not possibly be located), but can not be used to determine precisely where a node is located. Oftentimes the location or position of the node is only known with a low degree of precision, and displaying a position using absolute coordinates does not allow an end user to determine where the location or position is likely to be. For example, when position of a node is displayed as a circle, the end user is unable to reconcile the displayed position with the actual real world position since there is no way for the end user to determine the precision of the location or position or where the errors in this precision lie or what the values of those errors are, etc. Moreover, in some cases, the end user may want to know the location or position of the node with more or less accuracy. As such, in many cases, the known techniques for representing the location or position of a node are insufficient, and it would be desirable to provide the end user with a way to also estimate of the precision of the location or position.

Moreover, representing the location or position of the node using only a centroid and some indication of precision allows only for symmetrical positioning errors to be communicated to the end user, when in reality, positioning errors are rarely symmetrical. Environmental conditions, for instance, are rarely symmetrical and therefore the precision of position measurement information can be different depending on the direction (or angle) one is considering. This is particularly true when the location or position of the node is calculated based on different types of position measurement information from different reference nodes since the relative precision of the different types of position measurement information from the different reference nodes can vary. Unfortunately, in many environments, this position measurement information can be extremely inaccurate.

The disclosed embodiments relate to techniques for determining and representing a location or position of a node in a communication network. The disclosed embodiments can be used in conjunction with any known locationing or positioning technology that relies on position measurement information which does not have uniform precision. The disclosed techniques can allow for the location or position of a node to be determined based on position measurement information from different reference nodes even when the precision of the different position measurement information varies or is of "differing precision."

Embodiments of the present invention represent the position of a node using a position probability space (PPS). As used herein the term "position probability space (PPS)" refers to a zone or space where a node is likely to be located or positioned. The location or position of the node, and the precision of this location or position, are represented as a centroid (i.e., a set of coordinates) with a zone or space around it which reflects a region where the node is likely to be located with relative certainty or precision. A contour of the zone or space around the centroid is defined by a series of vectors (magnitudes and angles) which originate from the centroid. The PPS represents not only the location or the position of the node, but also the accuracy or precision of that location or position. Thus, in the disclosed embodiments, instead of representing the location or position of the node as a point, the location or position of the node is displayed as an area or volume, which is typically asymmetric, to help illustrate the location or position of the node to the end user taking into account the differing precisions of the position measurement information.

Depending on the implementation, the PPS can represent the location or position of the node within a known area where the node is likely to be located or a known volume where the node is likely to be located. By representing the location or position of a node using a PPS, the location or position of the node can be expressed as a known area or a volume of probability or precision instead of as a point. For example, in some implementations, the PPS represents the location or position of the node as an area or "in two-dimensional space," and this area can be expressed as a parametric function representing a discretized view of a plane. By contrast, in other implementations, the PPS represents the location or position of the node as a volume or "in three-dimensional space," and this volume can be represented as a matrix of values representing a discretized view of a space.

A PPS representation of a node's location or position is more accurate than a center/radius representation and allows for much higher granularity. A PPS representation of a node's location or position is also easy to display on a graphical interface and "speaks" to the user more than a grid or a circle. Using a PPS to represent the location or position of the node can be particularly useful in environments where the precision of position measurement information tends to vary (e.g., in indoor position calculation scenarios to display a location of wide-band radios where small errors in position may indicate different floors, rooms, or buildings).

Figure 1:
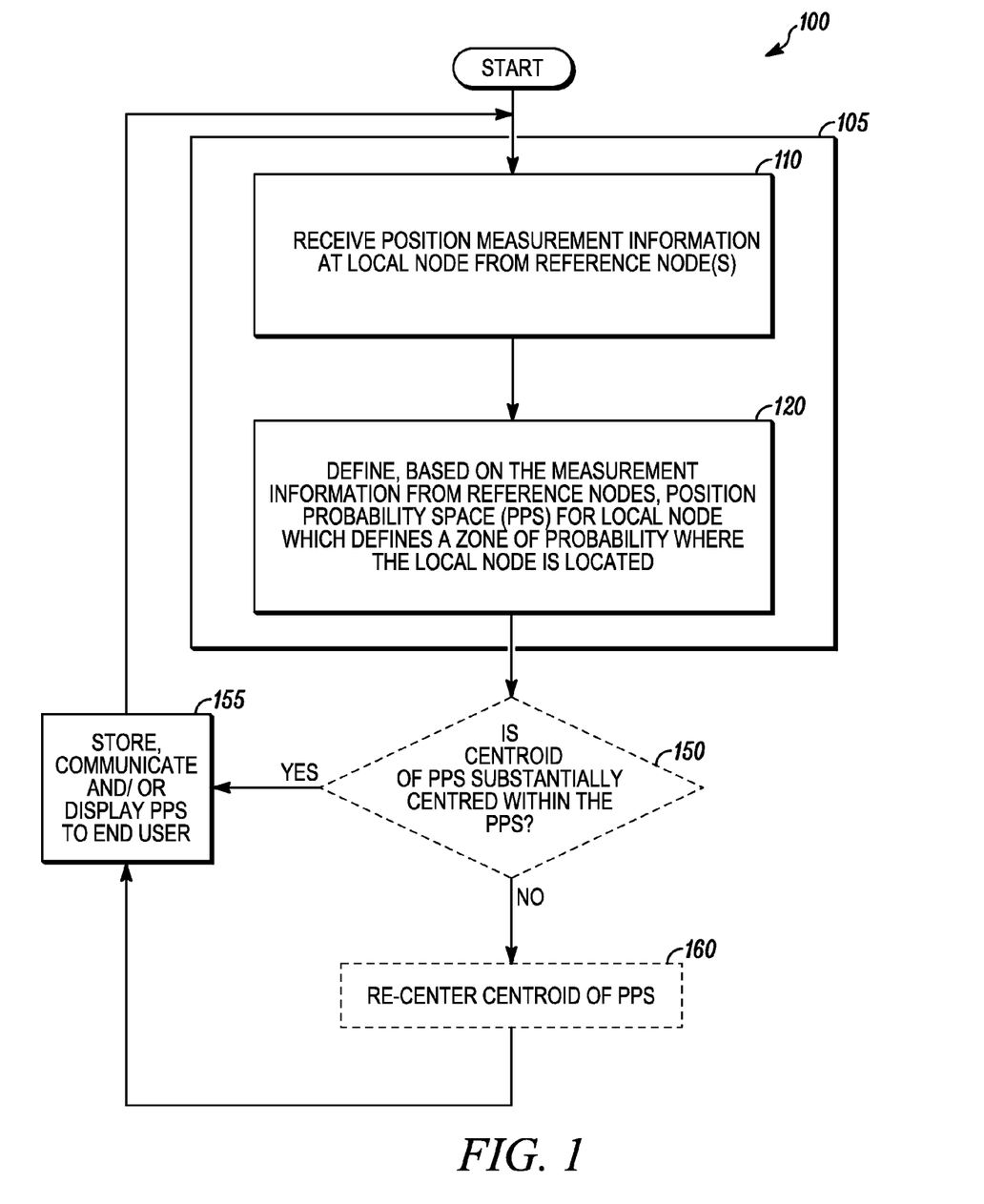
FIG. 1 is a flowchart illustrating a method for determining a position probability space (PPS) and re-centering a centroid of the PPS.

FIG. 1 is a flowchart illustrating a method 100 for determining a position probability space (PPS) and re-centering a centroid of the PPS. As used herein, the terms "local node" and "reference node" or "reference nodes" will be used to differentiate between a local node that is determining its position probability space (PPS), and one or more reference nodes that are providing position measurement information to the local node so that the local node can re-compute or refine its PPS.

The first time method 100 starts, the local node may have some type of position information, for example, a global positioning system (GPS) measurement, position information from a reference node, user input or prior position information that the local node has previously calculated and stored in memory. The local node can use this position information to calculate a representation of its position referred to here as a starting position estimate. If no prior position information is available, then the local node assumes that it has a starting position estimate which consists of a point and a set of vectors having infinite magnitudes.

At step 105, the first time the method 100 executes or iterates, the local node determines its initial PPS (IPPS) by performing steps 110 and 120. Thereafter, during each subsequent execution or iteration of method 100, the method 100 re-computes or redefines its current PPS as an updated PPS (UPPS).

At step 110, the local node receives and collects positioning measurement information from one or more reference nodes. The position measurement information received from a particular reference node can be, for example, a set of data such as distances to reference points, absolute coordinates or motion parameters. Each set of position measurement information received from a particular reference node has an accuracy or precision associated therewith which depends on factors such as clock accuracy, the number of samples, the RF environment or the sampling rate.

At step 120, the local node uses the starting position estimate and the positioning measurement information to generate or create an initial PPS (IPPS). A PPS and techniques for generating it are described below with respect to FIG. 2 and 3B, respectively. As noted above, the local node generates and stores the IPPS as a centroid (defined by coordinates either x, y or x, y, z) and a series of vectors originating at the centroid to define the space, where each vector is specified as a magnitude and an angle/direction. In this regard, the "space" can be either an area or a volume depending on the implementation. The space represents a zone of probability where the local node is located. Although not illustrated in the method 100 of FIG. 1, in some implementations, a different series of vectors can be determined for each level of accuracy/precision desired, and in such implementations a series of IPPSs can be generated with each one having its own accuracy or precision.

Steps 150 and 160 are optional and therefore illustrated in dotted line boxes. At step 150, the local node determines whether the centroid of the PPS is substantially centered within the space or zone that defines the PPS. In some cases, the centroid of the PPS can be off-center in which case it becomes important to re-center the centroid of the PPS so that the PPS representation of the location or position of the node is closer to the shape of a circle (in a two-dimensional representation) or a sphere (in a three-dimensional representation).

When the local node determines that the centroid of the PPS is substantially centered within the space or zone defined by the PPS, the method 100 proceeds to step 155, where the IPPS is stored and/or communicated and/or displayed by the local node to the end user so that the PSS may then be viewed by the end user. The end user can be either a provider or a consumer of position and distance measurements. The IPSS may be relayed to the end user without modification, or the centroid and vectors which represent the IPSS may first be converted to some other representation (zone, grid, polygon etc.).

On the other hand, when the local node determines that the centroid of the PPS is not substantially centered within the space or zone defined by the PPS, the method 100 proceeds to step 160, where the centroid of the IPPS is re-centered. In other words, when the local node determines that the centroid of the IPPS is not substantially centered within the contour that defines the IPPS, then the method 100 proceeds to step 160, where the local node performs calculations to re-center the centroid of the IPPS such that it is substantially centered within the contour that defines the IPPS. Techniques for re-calculating the centroid of the polygon having a contour defined by the vectors (angles and precisions) are known in the art and therefore are not described in detail herein. An example illustration of re-centering the centroid (x,y) of a PPS 301 is illustrated in FIG. 3C. The method 100 then proceeds to step 155 where the re-centered IPPS is stored and/or communicated and/or displayed to the end user (e.g., the local node communicates and/or displays the re-centered IPPS to the end user).

Following step 155, the method 100 loops back to step 105. Each time the method 100 executes or iterates the local node will determine an updated PPS (UPPS). In other words, the definition of the PPS that was computed during the most recent iteration of method 100 is refined by shortening or reducing the magnitudes or "lengths" of the vectors which define the prior PPS based on new or updated positioning measurement information from one or more reference nodes. In this manner, the overall space or zone represented by by the UPPS is reduced in comparison to the prior PPS and the zone of probability where the local node is positioned becomes more accurate with each iteration of method 100. As time goes by, the magnitude of the vectors may increase because the local node may be moving and the measurement data may become obsolete.

Generating a Position Probability Space (PPS)

Figure 2:
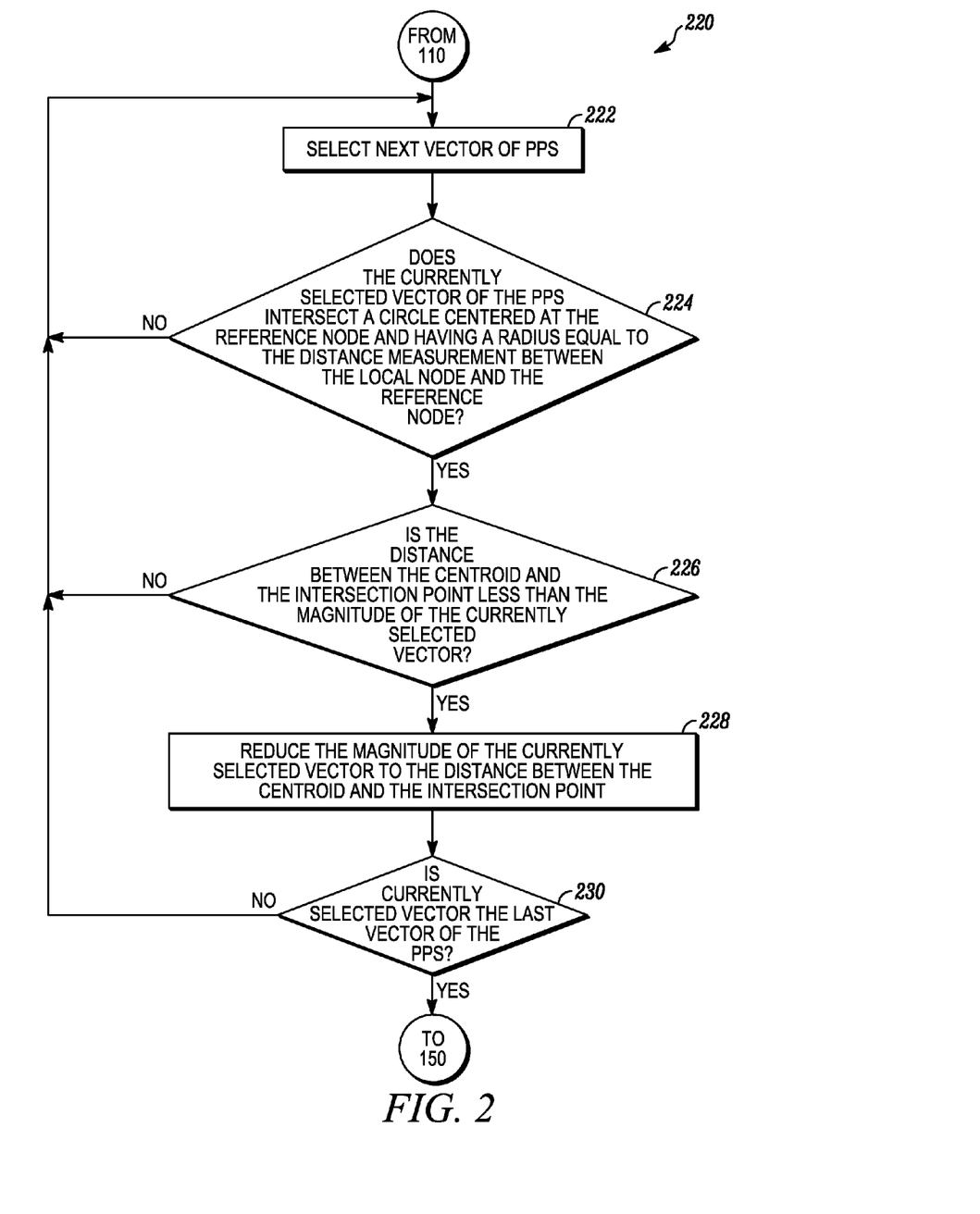
FIG. 2 is a flowchart illustrating a method for determining a position probability space (PPS) in accordance with some embodiments of the present invention.

FIG. 2 is a flowchart illustrating a method 220 for determining a position probability space (PPS) in accordance with some embodiments of the present invention.

The method 220 begins at step 222, where the local node selects a vector of its starting position estimate or an existing PPS. During the first iteration of method 220, the local node will select the "first" vector of either the starting position estimate or the existing PPS depending on what iteration the method 100 of FIG. 1 is presently in. For example, during the first iteration of method 100 of FIG. 1, the local node does not yet have a PPS, but must instead uses its starting position estimate to determine an IPPS. During a subsequent iteration of method 100 of FIG. 1, the local node uses the IPPS to determine an updated PPS (UPPS), and so on. For purposes of discussion, the remaining description of FIG. 2 will refer to vectors of an existing PPS, although the same principles apply to vectors of a starting position estimate as well.

At step 224, the local node determines whether the currently selected vector of the PPS intersects a circle which is defined based on position measurement information from a reference node. The circle is centered at the location of the reference node and has a radius equal to the distance between the local node and the reference node.

When the local node determines that the currently selected vector of the PPS does not intersect the circle associated with the reference node, the method 220 loops back to step 222, where the local node selects the next vector of the PPS.

When the local node determines that the currently selected vector of the PPS does intersect the circle associated with the reference node, the method 220 proceeds to step 226, where the local node determines whether the distance between the centroid of the PPS and the intersection point of the currently selected vector is less than the current magnitude of the selected vector.

When the local node determines that the distance between the centroid of the PPS and the intersection point of the currently selected vector is not less than (i.e., is greater than or equal to) the current magnitude of the selected vector, the method 220 loops back to step 222, where the local node selects the next vector of the PPS. By contrast, when the local node determines that the distance between the centroid of the PPS and the intersection point of the currently selected vector is less than the current magnitude of the selected vector, then method 220 proceeds to step 228, where the local node reduces the magnitude (or length) of the currently selected vector to the distance between the centroid of the PPS and the intersection point of the currently selected vector. The method 220 then proceeds to step 230, where the local node determine whether the currently selected vector is the last vector of the PPS. When the local node determines that the currently selected vector is not the last vector of the PPS, then method 220 loops back to step 222. When the local node determines that the currently selected vector is the last vector of the PPS, then method 220 proceeds to step 150 of FIG. 1.

Numerical Representation of a Two-Dimensional Position Probability Space (PPS)

Figure 3A:
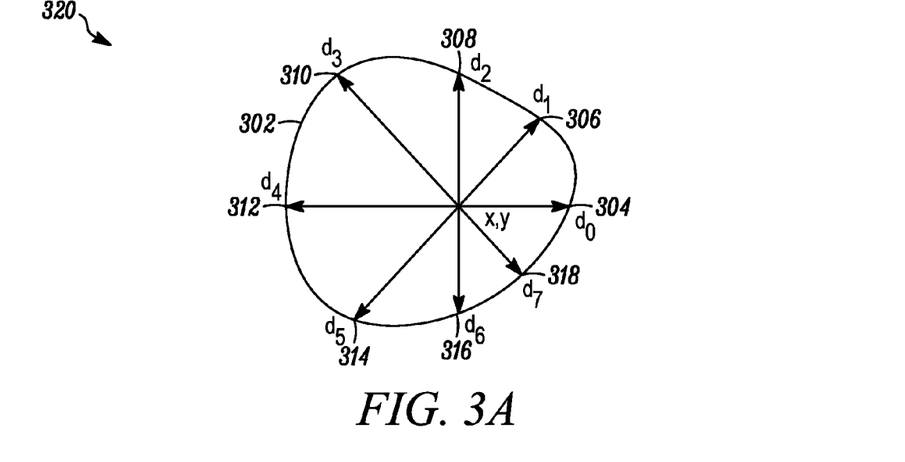
FIG. 3A is a graph which illustrates an example of a position probability space (PPS) for a local node in accordance with some embodiments of the present invention.

FIG. 3A is a graph 320 which illustrates an example of a position probability space (PPS) 302 for a local node in accordance with some embodiments of the present invention. In this example, the PPS 302 is displayed in a two-dimensional polar coordinate system as a parametric function that defines the expected position of a node as a geographical area, and therefore the PPS 302 is actually a position probability area (PPA), but will be referred to as a PPS for purposes of consistency. The PPS 302 includes a centroid (x, y) and a contour 302 having multiple, different radii all of which originate at the centroid (x, y). These radii can be initially defined by series of vectors 304, 306, 308, 310, 312, 314, 316, 318 which define the contour 302 of a two-dimensional space which defines the PPS 300.

The graph 320 of the PPS 302 represents the probable position of the local node as a centroid (x, y) and a series of vectors 304-318 represented by single headed arrows which originate from the centroid (x, y). In this example, the number (N) of vectors used to represent the PPS 302 is eight (8), and the vectors 304-318 have angles (0, π/8, π/4, 3π/8, π/2, 5π/8, 3π/4, 7π/8) corresponding to an angular resolution of π/8, and corresponding magnitudes ($d_0$ through $d_8$). However, the number (N) of vectors can be adjusted to accommodate a need for higher or lower precision, as illustrated in Table 1 which is a parametric representation of a PPS 302, where the first row is a series of angles (0 ... 2π(N−1)/N), and the second row is a series of corresponding magnitudes ($d_0$ through $d_{N-1}$).

TABLE 1

| | Angle (°) | | | | |
|---|---|---|---|---|---|
| | 0 | 2π/N | 4π/N | 6π/N | ... | 2π (N − 1)/N |
| Distance (m) | $d_0$ | $d_1$ | $d_2$ | $d_3$ | ... | $d_{N-1}$ |

In this example, the vector 304 has a length/magnitude ($d_0$) that reflects the precision of position measurement information for a particular angle of the vector 304 (0 degrees). The local node can be located at any point within the contour of the PPS 302, but can not be located or positioned at points outside the contour of the PPS 302.

While the PPS 302 described with reference to FIG. 3A is represented using only two dimensions, in alternative implementations, the centroid and the set of angles can be described in three dimensions as a probability volume or zone. In such implementations, in addition to longitude and latitude, the centroid is defined with altitude, and the set of angles would be representable in a matrix instead of an array.

Figure 3B:
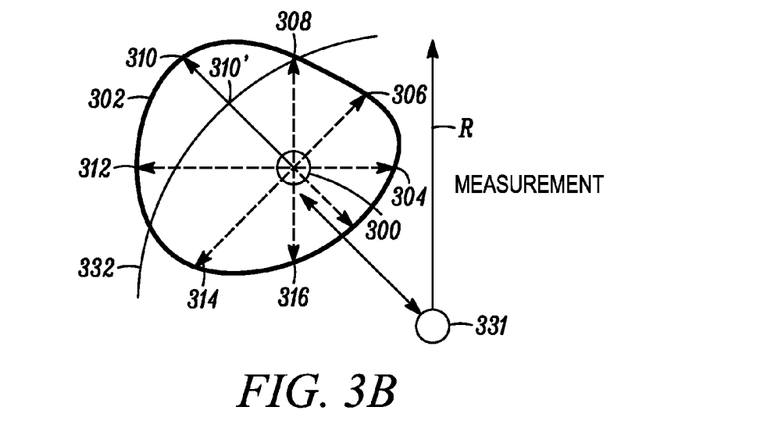
FIG. 3B is a diagram illustrating a method for modifying one vector of a PPS of a local node based on position measurement information from a reference node in accordance with some embodiments of the present invention.
Figure 3C:
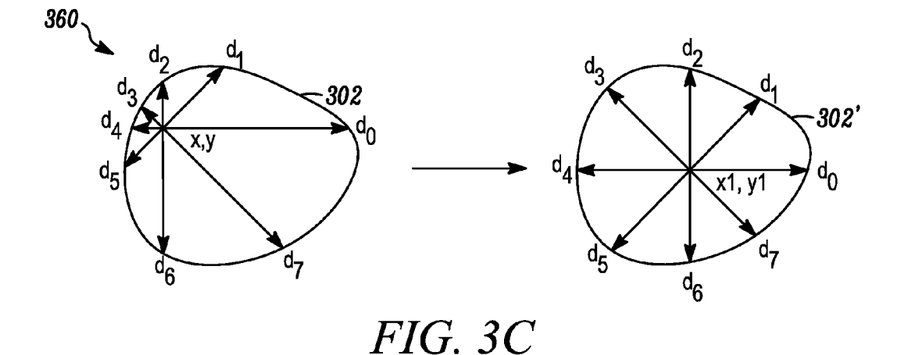
FIG. 3C is a diagram illustrating a method for re-centering a centroid (x,y) of a PPS in accordance with some embodiments of the present invention.

To illustrate how the method 220 of FIG. 2 would apply in a practical example, steps 222-228 of FIG. 2 will be described with reference to FIG. 3B. FIG. 3B is a diagram illustrating a method for shortening a vector 310 of an existing PPS 302 of a local node 300 based on position measurement information 332 from a reference node 331 in accordance with some embodiments of the present invention.

In FIG. 3B, the first vector of PPS 302 that is selected is vector 304. In the example illustrated in FIG. 3B, the circle 332 is centered at the location of the reference node 331 and has a radius (r) equal to the distance between the local node 300 and the reference node 331, and there is no intersection between vector 304 and circle 332. In the example illustrated in FIG. 3A, step 222 and 224 would continue to iterate and loop back until the selected vector is vector 308, and when the method 300 reaches step 224, the local node will determine that vector 308 does intersect the circle 332, and then proceeds to step 226. At step 226, the local node will determine that the distance between the centroid of the PPS and the intersection point of the currently selected vector 308 is not less than the current magnitude of the selected vector 308, but is instead of equal magnitude (i.e., vector 308 stops precisely on circle 332), and therefore the method 300 will loop back to step 222, where vector 310 is selected as the next vector. When vector 310 is the currently selected vector, the method will proceed from step 222 to step 224 to step 226, where the local node will determine that the distance between the centroid of the PPS and the intersection point of the currently selected vector 310 is less than the current magnitude of the selected vector 310, and the method would then proceed to step 228. At step 228, the local node reduces the magnitude (or length) of the currently selected vector 310 to the distance between the centroid of the PPS 302 and the intersection point of the currently selected vector 310. The new magnitude of the currently selected vector 310 is now 310'.

FIG. 3C is a diagram which illustrates re-centering of a centroid (x,y) of a PPS 302 in accordance with some embodiments of the present invention. As described above with reference to steps 150 and 160 of FIG. 1, when the local node determines that the centroid (x, y) of the PPS 302 is not substantially centered within the contour that defines the PPS 302, then the local node performs calculations to re-center the centroid (x1, y1) of the PPS 302' such that it is substantially centered within the contour that defines the PPS 302'. Techniques for re-calculating the centroid of the polygon having a contour defined by the vectors and angles are well-known in the art and therefore will not be described in detail herein.

In the scenarios above, techniques are described for determining an initial position probability space (IPPS), re-centering a centroid of the IPPS, and continuously re-computing an updated position probability space (UPPS) as position measurement information is received from reference nodes by a local node. In some cases, the location or position of reference nodes are fixed and hence known. Techniques will be described herein below for computing a UPPS when the local node has an existing PPS for the local node (e.g., the IPPS) and the locations or positions of the reference nodes are known.

Figure 4:
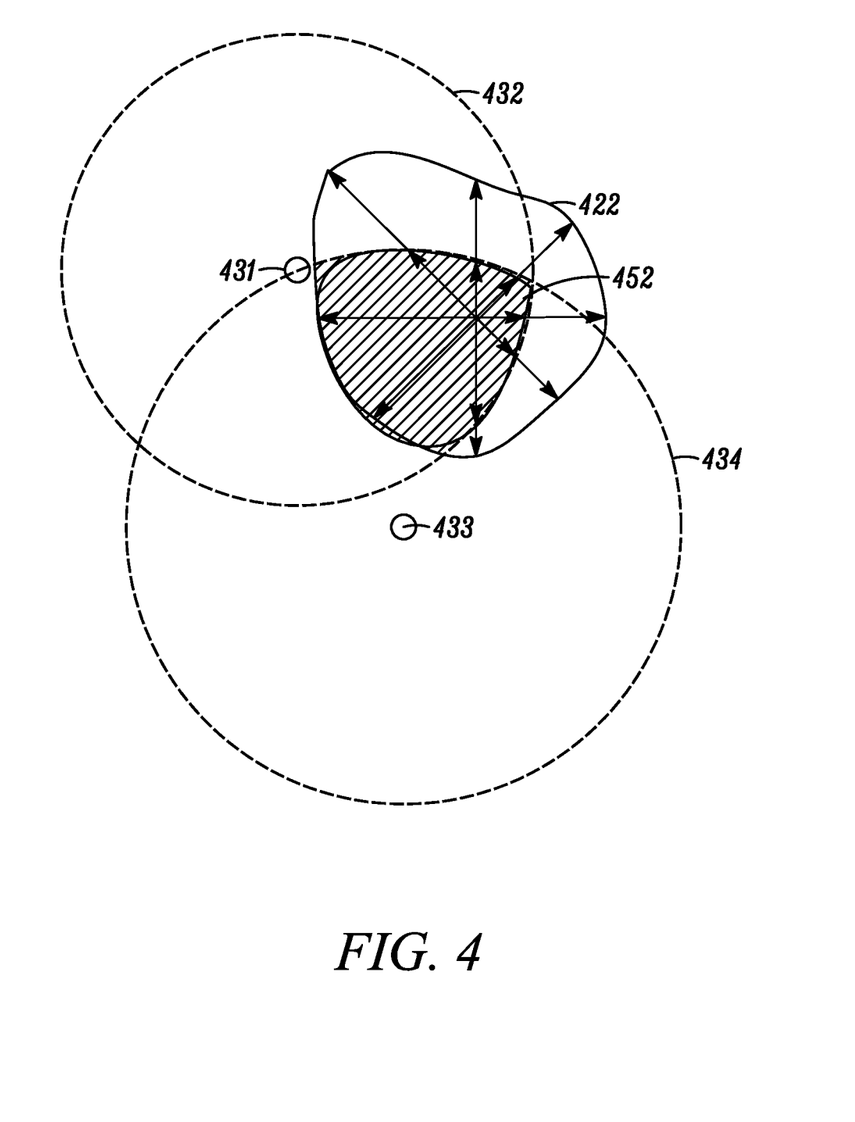
FIG. 4 is a graph of an existing position probability space (EPPS) along with positioning measurement information from two reference nodes that are used to re-define the EPPS as an updated local position probability space (UPPS) in accordance with some embodiments of the present invention.

FIG. 4 is a graph of an existing position probability space (EPPS) 422 displayed in polar coordinate system along with positioning measurement information 432, 434 from two reference nodes 431, 433 that is used to re-define the EPPS 422 as an updated local position probability space (UPPS) 452 in accordance with some embodiments of the present invention.

Here, the EPPS 422 includes a centroid (not labeled) and a series of vectors which originate at the centroid. The EPPS 422 defines a contour of a two-dimensional space where the local node can potentially be located. The node can be located at any point inside or within the contour of the EPPS 422. All points outside the EPPS 422 are eliminated from consideration since it is not possible for the local node to be in those locations/positions.

Because the reference nodes 431, 433 have a known location or position, the position of the reference nodes is relatively predictable, and can therefore be represented using a simple circle. The positioning measurement information provided to the local node from the reference node 431 defines a radius of dotted-line circle 432, and positioning measurement information provided to the local node from the reference node 433 defines a radius of dotted-line circle 434.

The local node can use position measurement information 431, 432 received from the reference nodes 431, 432 to compute an updated PPS by shortening vectors of the EPPS 422 based on position measurement information 431, 432. In this implementation, the local node can determine which portions of the EPPS 422 overlap with circles 432, 434, and the resultant overlapping area represents the UPPS 452. In other words, the superposition of the EPPS 422 and circles 432, 434 defines the UPPS 452. The local node can be anywhere within the UPPS 452, and hence the position of the local node is specified with a much higher degree of precision since the UPPS 452 has a smaller area than the EPPS 422.

In the scenarios discussed herein above, techniques are described for determining an initial position probability space (IPPS), re-centering a centroid of the IPPS, and continuously re-computing an updated position probability space (UPPS) as position measurement information is received from reference nodes by a local node. Techniques are also described for computing a UPPS when the local node has an IPPS and the locations or positions of the reference nodes are known. In other cases, a reference node can be mobile and therefore the location or position of the reference node is unknown (or known only with some degree of accuracy or precision). Techniques will be described herein below with reference to FIG. 5 for computing a UPPS when the local node has an IPPS and the location or position of the reference node is known only with a limited certainty based on a reference position probability area (RPPA) associated with the reference node.

Figure 5:
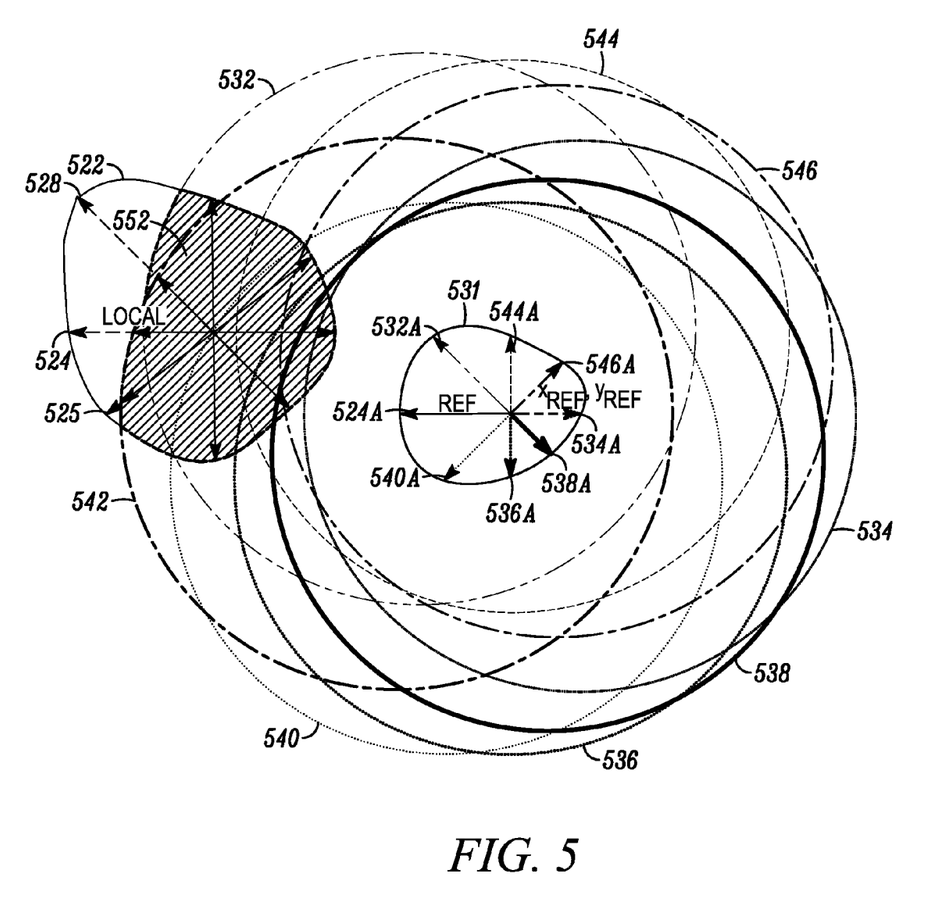
FIG. 5 is a graph of an existing position probability space (EPPS) displayed along with a reference position probability space (RPPS) associated with a single mobile reference node that is used to re-compute or re-define the EPPS as an updated local position probability space (UPPS) in accordance with some other embodiments of the present invention.

FIG. 5 is a graph of an existing position probability space (EPPS) 522 displayed in polar coordinate system along with a reference position probability space (RPPS) 531 associated with a single mobile reference node that is used to re-compute or re-define the EPPS 522 as an updated local position probability space (UPPS) 552 in accordance with some embodiments of the present invention.

The EPPS 522 of the local node represents the probable position of the local node as a centroid (x, y) and a series of vectors represented by single headed arrows which originate from the centroid (x, y). The EPPS 522 defines a contour of a two-dimensional space where the local node can potentially be located. The local node can be located at any point inside or within the contour of the EPPS 522. All points outside the EPPS 522 are eliminated from consideration since it is not possible for the local node to be in those locations/positions.

Because the reference node does not have a well-known position (e.g., it is not fixed), the position of the reference node are represented using a RPPS 531 that is determined by the reference node using the techniques described above. The RPPS 531 of the reference node represents the probable position of the reference node as a centroid ($x_{Ref}$, $y_{Ref}$) and a series of vectors 532A-546A represented by single headed arrows which originate from the centroid ($x_{Ref}$, $y_{Ref}$). In FIG. 5, the positioning measurement information 532, 534, 536, 538, 540, 542, 544, 546 from the mobile reference node is illustrated as a group of circles, and the each of the circles 532, 534, 536, 538, 540, 542, 544, 546 is centered at (i.e., has a radius that originates at) the end of the vector having the same reference numeral. For example, circle 544 has a radius that originates at the end of the vector 544A. The radius of circle 544 is equal to the distance between the reference node and the local node.

Here the local node computes UPPS 552 (illustrated by the dotted-line contour) for the local node by shortening vectors of the EPPS 522 based on position measurement information 532, 534, 536, 538, 540, 542, 544, 546 from the RPPS 631 associated with the mobile reference node. In this implementation, the local node can compute the UPPS 552 by determining which portions of the existing PPS 522 overlap with each of the circles 532, 534, 536, 538, 540, 542, 544, 546 associated with vectors 532A, 534A, 536A, 538A, 540A, 542A, 544A, 546A of the RPPS 531, and the resultant overlapping area represents the UPPS 552. In other words, after all of the circles 532, 534, 536, 538, 540, 542, 544, 546 have been mapped with respect to the EPPS 522, the UPPS 552 is generated by eliminating all points outside of those circles 532, 534, 536, 538, 540, 542, 544, 546 (i.e., any points that are not within at least one of the circles 532, 534, 536, 538, 540, 542, 544, 546) from the EPPS 522 since it is not possible for the local node to be that far away from the reference node, even using the most conservative estimate of the reference node's position. As illustrated in FIG. 5, the superposition of the EPPS 522 and circles 532, 534, 536, 538, 540, 542, 544, 546 associated with vectors 532A, 534A, 536A, 538A, 540A, 542A, 544A, 546A of the RPPS 531 defines the UPPS 552. In this example, portion of the vectors 524, 526, 528 of the EPPS 522 are eliminated or shortened in the UPPS 552. The local node can be anywhere within the UPPS 552, and hence the position of the local node is specified with a much higher degree of precision since the UPPS 552 has a smaller area than the EPPS 522.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In a network comprising a node and at least one reference node, a method of determining an updated most likely position of the node in the network, the method comprising:
   identifying a first position probability space (PPS) associated with the node comprising a first centroid having a set of coordinates and a first se of a plurality of first vectors, each originating from the first centroid and defined by a magnitude and direction, wherein the magnitude of each first vector reflects an accuracy of a position of the node in the direction of the first vector;
   receiving, at the node, updated position measurement information from the reference node; and
   modifying, by the node and as a function of the received updated position measurement information, the first PPS to create an updated PPS (UPPS) that defines a space that encompasses positions where the node is most likely currently positioned in the network;
   wherein the UPPS comprises:
      a second centroid having a second set of coordinates; and
      a second set of a plurality of second vectors, each defined by a magnitude and direction, which originate from the second centroid and define the space around the second centroid, wherein the magnitude of each second vector reflects an accuracy of the current position of the node in the direction of the second vector and is determined as a function of the magnitude of a corresponding first vector and the received updated position measurement information.

2. The method according to claim 1, wherein the first PPS is a starting position estimate comprising a starting centroid and a set of starting vectors, wherein the position measurement information defines a circle centered at the location of the reference node and has a radius equal to the distance between the node and the reference node, and wherein the step of modifying, at the node based on the received position measurement information, the first PPS comprises:
   (a) selecting, at the node, a first selected vector of the starting position estimate;
   (b) determining, at the node, whether the first selected vector intersects the circle;
   (c) determining, at the node when the first selected vector intersects the circle, a distance between the starting centroid of the starting position estimate and an intersection point of the currently selected vector;
   (d) determining, at the node, whether the distance is less than the magnitude of the first selected vector;
   (e) reducing the magnitude of the first selected vector, at the node when the distance is less than the magnitude of the first selected vector, to the distance between the starting centroid and the intersection point of the first selected vector; and
   (f) repeating steps (a) through (e) for each remaining vector of the set of starting vectors in the starting position estimate.

3. The method according to claim 2, further comprising:
   selecting, at the node, a second vector of the remaining vectors of the set of starting vectors in the starting position estimate when the node determines that the first selected vector of the starting position estimate does not intersect the circle or when the node determines that the distance between the starting centroid of the starting position estimate and the intersection point of the first selected vector is greater than or equal to the magnitude of the first selected vector of the starting position estimate.

4. The method according to claim 1, further comprising:
   receiving, at the node, second updated position measurement information from a second reference node; and
   modifying, at the node based on the second updated position measurement information, the UPPS to create a second UPPS by reducing the magnitudes of the vectors that define the UPPS to reduce a space occupied by the second UPPS in comparison to the space occupied by the UPPS.

5. The method according to claim 1, further comprising:
   determining, at the node, whether the centroid of the UPPS is substantially centered within the space that defines the UPPS; and
   re-centering the second centroid of the UPPS such that it is substantially centered within the UPPS.

6. The method according to claim 1, wherein the reference nodes comprise a first reference node having a first fixed location and a second reference node having a second fixed location, and further comprising:
   receiving, at the node, first position measurement information from the first reference node, where the first position measurement information is represented as a first space centered at the first fixed location and having a first radius;
   receiving, at the node, second position measurement information from the second reference node, where the second position measurement information is represented as a second space centered at the second fixed location and having a second radius, wherein precision of the first position measurement information differs from precision of the second position measurement information;
   determining, at the node, which portions of the UPPS overlap with both the first and second spaces; and
   modify, at the node, the UPPS to create a second UPPS by removing portions of any vectors of the UPPS that do not overlap with both the first space and the second space such that the second UPPS is defined by the overlapping portions of the UPPS, the first space, and the second space.

7. The method according to claim 1, wherein one of the reference nodes comprises a mobile reference node having a location specified by a reference position probability space (RPPS) associated with the mobile reference node, and further comprising:
   receiving, at the node, the RPPS, wherein the RPPS comprises a reference centroid and a set of reference vectors associated with the mobile reference node, wherein each of the reference vectors defines a reference space, wherein each reference space comprises a reference centroid that is centered at the end of the reference vector and has a reference radius that originates from the reference centroid;
   determining, at the node, which portions of the UPPS overlap with each of the reference spaces of the RPPS; and
   modifying, at the node, the UPPS to create a second UPPS by removing portions of any vectors of the UPPS that do not overlap with at least one of reference spaces such that the second UPPS is defined by the portions of the UPPS that overlap with each of the reference spaces of the RPPS.

8. The method according to claim 1, further comprising at least one of:
    storing the UPPS in a memory at the node;
    communicating the UPPS to an end user; and
    displaying the UPPS to the end user on a graphical user interface so that the PSS is viewable by the end user.

9. The method according to claim 1, wherein the space comprises: a two-dimensional space and the first and second centroids comprise two-dimensional coordinates.

10. The method according to claim 1, wherein the space comprises: a three-dimensional space and the first and second centroids comprise three-dimensional coordinates.

11. The method according to claim 1, wherein the second set of vectors include at least three particular vectors that have different magnitudes and directions.

12. The method of claim 1, wherein the first PPS is a previously calculated PPS stored at the node.

13. The method of claim 1, wherein the first PPS is a starting position estimate comprising a first centroid coordinate point provided by one of a global positioning system (GPS) measurement, a reference node, user input, and previously stored position information, and the first set of the plurality of vectors are set to have infinite magnitudes.

14. A node capable of determining its own updated most likely location in a network, the node comprising:
    a receiver configured to receive updated position measurement information from a reference node; and
    a processor configured to:
        identify a first position probability space (PPS) associated with the node comprising a first centroid having a set of coordinates and a first set of a plurality of first vectors, each originating from the first centroid and defined by a magnitude and direction, wherein the magnitude of each first vector reflects and accuracy of a position of the node in the direction of the first vector;
        modify, as a function of the received updated position measurement information, the first PPS to create an updated PPS (UPPS) that defines a space that encompasses positions where the node is most likely currently positioned in the network;
    wherein the UPPS comprises:
        a second centroid having a second set of coordinates; and
        a second set of a plurality of second vectors, each defined by a magnitude and direction, which originate from the second centroid and define the space around the second centroid, wherein the magnitude of each vector reflects an accuracy of the position of the node in the direction of the second vector and is determined as a function of the magnitude of a corresponding first vector and the received updated position measurement information.

15. The node according to claim 14, wherein the position measurement information defines a circle centered at the location of the reference node and has a radius equal to the distance between the node and the reference node, and
    wherein the processor is designed to determine, for each first vector, whether that first vector intersects the circle, and when the first vector intersects the circle, to reduce the magnitude of the first vector to a distance between the starting centroid and an intersection point of the first vector with the circle.

16. The node according to claim 14, wherein the receiver is designed to receive second updated position measurement information from a second reference node, and wherein the processor is designed to modify, based on the second updated position measurement information, the UPPS to create a second UPPS by reducing the magnitudes of the vectors that define the UPPS to reduce a space occupied by the second UPPS in comparison to the space occupied by the UPPS.

17. The node according to claim 14, wherein the processor is designed to re-center the centroid of the UPPS such that it is substantially centered within the UPPS.

18. The node according to claim 14, wherein the receiver is further designed to receive first position measurement information from a first reference node having a first fixed location and second position measurement information from a second reference node having a second fixed location, wherein the first position measurement information is represented as a first space centered at the first fixed location and having a first radius, and wherein the second position measurement information is represented as a second space centered at the second fixed location and having a second radius, and wherein the processor is designed to modify the UPPS to create a second UPPS by removing portions of any vectors of the UPPS that do not overlap with both the first space and the second space such that the second UPPS is defined by the overlapping portions of the UPPS, the first space, and the second space.

19. The node according to claim 14, wherein one of the reference nodes comprises a mobile reference node having a location specified by a reference position probability space (RPPS) associated with the mobile reference node, wherein the RPPS comprises a reference centroid and a set of reference vectors associated with the mobile reference node, wherein each of the reference vectors defines a reference space, wherein each reference space comprises a reference centroid that is centered at the end of the reference vector and has a reference radius that originates from the reference centroid, and
    wherein the receiver is further designed to receive the RPPS, and wherein the processor is further designed to modify the UPPS to create a second UPPS by removing portions of any vectors of the UPPS that do not overlap with at least one of reference spaces such that the second UPPS is defined by the portions of the UPPS that overlap with each of the reference spaces of the RPPS.

20. The node according to claim 14, further comprising at least one of:
    a memory designed to store the UPPS at the node;
    a transmitter designed to communicate the UPPS to an end user; and
    a graphical user interface designed to display the UPPS to the end user so that the UPSS is viewable by the end user.

21. The node according to claim 14, wherein the second set of vectors include at least three particular vectors that have different magnitudes and directions.

* * * * *

UNITED STATES PATENT AND TRADEMARK OFFICE
CERTIFICATE OF CORRECTION

PATENT NO. : 8,643,545 B2  Page 1 of 1
APPLICATION NO. : 11/965447
DATED : February 4, 2014
INVENTOR(S) : Strutt et al.

It is certified that error appears in the above-identified patent and that said Letters Patent is hereby corrected as shown below:

Title page, item (75), under "Inventors", in Column 1, Line 1, delete "Guenaell" and insert -- Guenael --, therefor.

Title page, item (75), under "Inventors", in Column 1, Line 2, delete "Deoge," and insert -- Doege, --, therefor.

In the Specification

Column 6, Line 38, delete "by by" and insert -- by --, therefor.

In the Claims

Column 11, Line 14, in Claim 1, delete "first se" and insert -- first set --, therefor.

Column 11, Line 21, in Claim 1, delete "by the" and insert -- at the --, therefor.

Column 14, Line 55, in Claim 20, delete "UPSS" and insert -- UPPS --, therefor.

Signed and Sealed this
Twenty-third Day of December, 2014

Michelle K. Lee
*Deputy Director of the United States Patent and Trademark Office*